US012600077B2

(12) United States Patent
Hayashi et al.

(10) Patent No.: US 12,600,077 B2
(45) Date of Patent: Apr. 14, 2026

(54) THERMOFORMING DEVICE

(71) Applicant: ASANO LABORATORIES CO., LTD., Aichi-gun (JP)

(72) Inventors: Kazushi Hayashi, Miyoshi (JP); Yasushi Oguma, Kitanagoya (JP); Norifumi Asao, Nagoya (JP)

(73) Assignee: ASANO LAB CO LTD, Togo-cho (JP)

( * ) Notice: Subject to any disclaimer, the term of this patent is extended or adjusted under 35 U.S.C. 154(b) by 199 days.

(21) Appl. No.: 18/271,559

(22) PCT Filed: Oct. 28, 2022

(86) PCT No.: PCT/JP2022/040465
§ 371 (c)(1),
(2) Date: Jul. 10, 2023

(87) PCT Pub. No.: WO2023/223575
PCT Pub. Date: Nov. 23, 2023

(65) Prior Publication Data
US 2025/0001672 A1     Jan. 2, 2025

(30) Foreign Application Priority Data

May 16, 2022    (JP) ................................. 2022-080261

(51) Int. Cl.
B29C 51/46        (2006.01)
B29C 51/10        (2006.01)
(Continued)

(52) U.S. Cl.
CPC ............ B29C 51/425 (2013.01); B29C 51/10 (2013.01); B29C 51/12 (2013.01); B29C 51/18 (2013.01);
(Continued)

(58) Field of Classification Search
CPC ....... B29C 51/36; B29C 51/20; B29C 51/145; B29C 51/46; B29C 51/425
See application file for complete search history.

(56) References Cited

U.S. PATENT DOCUMENTS 3,446,686 A * 5/1969 Butler ................... B29C 51/145
                                                        156/224
3,616,013 A * 10/1971 Bocchi ................ B32B 38/1858
                                                        156/499
(Continued)

FOREIGN PATENT DOCUMENTS

CN          103314156 A       9/2013
JP          H05-050497 A      3/1993
(Continued)

OTHER PUBLICATIONS

Nov. 7, 2024 International Preliminary Report on Patentability issued in International Patent Application PCT/JP2022/040465.
(Continued)

*Primary Examiner* — Matthew J Daniels
(74) *Attorney, Agent, or Firm* — Oliff PLC

(57)        ABSTRACT

A thermoforming device performs a heating process of radiationally heating a resin film to a predetermined temperature by a radiation heater and a bonding process of bonding the radiationally heated resin film to a pulp mold set on a base. The thermoforming device includes a vacuum pump to evacuate a space between the pulp mold and the resin film to bring the resin film to be in close contact with the pulp mold in the bonding process. The radiation heater is changeable in its distance to the resin film between a first heating position to perform radiation heating of the resin film in the heating process and a second heating position to perform radiation heating of the resin film in the bonding process.

5 Claims, 6 Drawing Sheets

(51) Int. Cl.

| | | |
|---|---|---|
| *B29C 51/12* | (2006.01) | |
| *B29C 51/18* | (2006.01) | |
| *B29C 51/42* | (2006.01) | |
| *B29K 23/00* | (2006.01) | |
| *B29K 67/00* | (2006.01) | |
| *B29K 105/00* | (2006.01) | |

(52) U.S. Cl.
CPC .......... *B29C 51/46* (2013.01); *B29K 2023/06* (2013.01); *B29K 2023/083* (2013.01); *B29K 2023/12* (2013.01); *B29K 2067/003* (2013.01); *B29K 2105/0085* (2013.01); *B29K 2905/00* (2013.01)

(56) References Cited

U.S. PATENT DOCUMENTS

| | | | | |
|---|---|---|---|---|
| 3,962,392 A | * | 6/1976 | Conner, Jr. ............. | B29C 51/44 264/237 |
| 4,194,938 A | * | 3/1980 | Figge ...................... | B32B 27/12 156/212 |
| 4,740,417 A | * | 4/1988 | Tornero ................ | B29C 51/145 156/224 |
| 5,614,145 A | | 3/1997 | O'Kane | |
| 5,641,524 A | * | 6/1997 | Rush ...................... | B29C 51/04 264/549 |
| 5,778,145 A | * | 7/1998 | De Nichilo .......... | B29B 13/023 392/416 |

| | | | | |
|---|---|---|---|---|
| 6,478,926 B1 | * | 11/2002 | Brachos ................ | B29C 70/342 425/388 |
| 2011/0259784 A1 | | 10/2011 | Tye et al. | |
| 2017/0057152 A1 | | 3/2017 | Mizoguchi et al. | |
| 2019/0193323 A1 | | 6/2019 | Nilsson | |

FOREIGN PATENT DOCUMENTS

| | | |
|---|---|---|
| JP | H07-186274 A | 7/1995 |
| JP | 3102916 B2 | 10/2000 |
| JP | 2001-233317 A | 8/2001 |
| JP | 2002-002655 A | 1/2002 |
| JP | 2002-103434 A | 4/2002 |
| JP | 2007-264373 A | 10/2007 |
| JP | 2011-523382 A | 8/2011 |
| JP | 4916149 B2 | 4/2012 |
| JP | 2015-057310 A | 3/2015 |
| TW | M572302 U | 1/2019 |

OTHER PUBLICATIONS

Dec. 20, 2022 International Search Report issued in International Patent Application No. PCT/JP2022/040465.
Jan. 24, 2024 Office Action issued in Chinese Patent Application No. 202280006739.6.
Sep. 11, 2025 Extended European Search Report issued in European Application No. 22917634.2-1014.

* cited by examiner

THERMOFORMING DEVICE

CROSS-REFERENCE TO RELATED APPLICATIONS

This is a national phase application filed under 35 U.S.C. 371 of PCT/JP2022/040465 filed on Oct. 28, 2022, which claims the benefit of priority from the prior Japanese Patent Application No. 2022-080261 filed on May 16, 2022, the entire contents of which are incorporated herein by reference.

TECHNICAL FIELD

The present invention relates to a thermoforming device provided with a radiation heater and a base, which is placed to oppose the radiation heater with a resin film interposed therebetween, for performing a heating process of radiationally heating the resin film by the radiation heater to a predetermined temperature at which the resin film becomes moldable, and a bonding process of bonding the resin film that has been radiationally heated to a fiber molding that is placed on the base.

BACKGROUND ART

Plastic containers have conventionally been used as packaging containers for food products, but the plastic containers are not naturally degradable when they are disposed, and thus, disposal has been considered as a cause of environmental pollution. In response to this problem, a fiber molding such as a pulp mold, which is naturally degradable even if they are disposed, is expected to prevent environmental pollution, and thus the fiber molding is increasingly used as the packaging containers for food products.

In using the fiber molding as the packaging containers for food products, when the food products are filled as they are, water contents and oil contents included in the food products could percolate to the fiber molding and could leak through the fiber molding. To address this, a process of giving water resistance and oil resistance to the fiber molding is generally applied by bonding a resin film having thermal plasticity to a surface of the fiber molding to which a food product comes to contact. For example, the Patent Document 1 has disclosed a paper container bonded with a resin film.

Bonding the resin film to the fiber molding is, for example, performed by a thermoforming device 100 provided with a radiation heater 6 for heating a resin film 4 and a lower die 5 on which a pulp mold 10 (one example of the fiber molding) is placed as shown in FIG. 5.

The thermoforming device 100 is a device of radiationally heating the resin film 4 to a predetermined temperature for molding by the radiation heater 6 so that the resin film 4, which has been radiationally heated and softened, is bonded with a pulp mold 10 placed on the lower die 5. Herein, a process of radiationally heating the resin film 4 to the predetermined temperature for molding by the radiation heater 6 is defined as a heating process, and a process of bonding the resin film 4 that has been radiationally heated and softened with the pulp mold 10 placed on the lower die 5 is defined as a bonding process.

The resin film 4 is, for example, a thermal plastic film which is made of polypropylene (PP). A thickness is set as 80 μm, for example. A melting point of the resin film 4 is 167° C., for example, and in the heating process, the resin film 4 is heated to 160° C. (a temperature C21 according to FIG. 6 (d)) as a predetermined temperature for molding. A surface of the resin film 4 which is to oppose the pulp mold 10 is provided with a bonding layer (not shown) made of an agent such as heat seal material in order to improve the bonding performance with the pulp mold 10.

The lower die 5 is provided with a frame 51, a pedestal 53, and the base 52. The frame 51 includes a cradle 512 and a peripheral wall 511 provided to stand from the cradle 512. The cradle 512 includes a vent 512a penetrating in a vertical direction VT, and this vent 512a is connected to a vacuum pump 7. The vacuum pump 7 can evacuate inside the frame 51 through the vent 512a.

Above the cradle 512, the pedestal 53 to mount the base 52 thereon is fixed with being surrounded by the peripheral wall 511. The pedestal 53 includes a plurality of communication passages 531 penetrating through the pedestal 53 in the vertical direction VT. On an upper end face in the vertical direction VT of the pedestal 53, the base 52 for placing the pulp mold 10 is mounted with being surrounded by the peripheral wall 11.

The base 52 is hollowed with a setting face 521 to conform to a shape of the pulp mold 10 on an end face on the radiation heater 6 side (an upper side in the vertical direction VT). Further, the base 52 is provided with a plurality of vacuum vent holes 522 opening to the setting face 521. When inside the frame 51 is evacuated by the vacuum pump 7, a side of the setting face 521 can be evacuated through the communication path 531 and the vacuum vent holes 522. In a state shown in FIG. 5, vacuum suction of the setting face 521 side can make it possible to tightly bond the resin film 4 with an inner face 104 of the pulp mold 10. The pulp mold 10 is breathable, and thus pressurizing and vacuum suction of the setting face 521 side are not obstructed even when the pulp mold 10 is placed on the setting face 521.

The radiation heater 6 is placed to oppose the lower die 5 with the resin film 4 interposed therebetween. A position of the radiation heater 6 indicated in FIG. 5 represents a heating position for performing radiation heating of the resin film 4 in the heating process. A distance D11 of the radiation heater 6 at the subject heating position relative to the base 52 is determined by output of the radiation heater 6, material of the resin film 4, target time taken for the heating process and the bonding process, and others.

The heating process and the boding process performed by the thermoforming device 100 having the above-mentioned configuration are now explained with reference to FIG. 6. FIG. 6 (a) is a time chart indicating the output of the radiation heater 6 in the bonding process and the heating process. FIG. 6 (b) is a time chart indicating an exhaust rate of the vacuum pump 7 in the bonding process and the heating process. FIG. 6 (c) is a time chart indicating a position of the radiation heater 6 (a distance of the radiation heater 6 to the base 52) in the bonding process and the heating process. FIG. 6 (d) is a graph indicating changes in the temperature of the resin film 4 in the bonding process and the heating process.

As shown in FIG. 6 (a), the radiation heater 6 starts its output at a time t1 to initiate the heating process. The output of the radiation heater 6 is kept constant at a temperature C11 through the heating process and the bonding process. Herein, a value of the temperature C11 is appropriately set based on the performance of the radiation heater 6, the material of the resin film 4 as an object to be heated, and others. In the subject case, the temperature of the radiation heater 6 is set as 600° C. Further, the distance of the radiation heater 6 relative to the base 52 is, as indicated in FIG. 6 (c), kept constant as the distance D11 through the heating process and the bonding process.

As indicated in FIG. 6 (d), the temperature of the resin film 4 rises in proportion to the lapse of time from the time t1 when heating by the radiation heater 6 has started. Then, the temperature of the resin film 4 reaches a temperature C21 (160°) at which the resin film 4 is moldable at the time t2, and thus the heating process is completed. A period of time required for the heating process (a term from the time t1 to the time t2) is determined depending on the output of the radiation heater 6, the distance of the radiation heater 6 to the base 52, the material of the resin film 4, and others, and determined as about 8 seconds, for example.

Once the heating process is completed, the thermoforming device 100 carries out the bonding process. Specifically, as indicated in FIG. 6 (b), vacuum suction by the vacuum pump 7 is performed from the time t2 at the maximum exhaust rate S11 corresponding to the performance of the vacuum pump 7. By performing this vacuum suction, the resin film 4 is shaped along the shape of the pulp mold 10 and bonded to the pulp mold 10. Time required for the bonding process (a period of time from the time t2 to the time t6) is determined depending on the output of the radiation heater 6, the distance of the radiation heater 6 to the base 52, a thickness and the material of the resin film 4, and others, and determined as about 15 seconds, for example.

The pulp mold 10 bonded with the resin film 4 is then conveyed to the following process by feeding the resin film 4 along a horizontal direction HZ, for example.

RELATED ART DOCUMENTS

Patent Documents

Patent Document 1: JP2001-233317A

SUMMARY OF INVENTION

Problems to be Solved by the Invention

When the resin film 4 is to be shaped by vacuum suction by the vacuum pump 7, the resin film 4 comes to contact with the pulp mold 10, so that the resin film 4 is cooled down by the pulp mold 10. Accordingly, the temperature of the resin film 4 falls from the temperature C21 to the temperature C23 as indicated in FIG. 6 (d). This fall in the temperature of the resin film 4 could result in insufficient bonding of the resin film 4.

To address the above problem, heating by the radiation heater 6 is continued at the time t2 and thereafter as indicated in FIG. 6 (a) so that the temperature of the resin film 4 rises again to the temperature C21. The heating is continued further after the time t5 when the temperature of the resin film 4 has reached the temperature C21 again in order to fix the resin film 4 to the pulp mold. Herein, during a term from the time t2 to the time t5, vacuum suction is kept performed as indicated in FIG. 6 (b) so that the resin film 4 is kept tightly adhered to the pulp mold 10 during the heating.

As compared with a position before shaping, the resin film 4 has come far away from the radiation heater 6 by the shaping. Due to this far distance, the heat amount given to the resin film 4 by the radiation heater 6 decreases, and thus re-rise in the temperature of the resin film 4 to the temperature C21 takes time (from the time t2 to the time t5) as long as the time required for the heating process (from the time t1 to the time t2) as indicated in FIG. 6 (d). This causes increase in the time required for the bonding process (from the time t2 to the time t6), which means the time required for the bonding process is about twice as long as the time required for the heating process. This results in degradation in manufacturing efficiency.

While shaping of the resin film 4 by vacuum suction is performed instantly, the temperature of the resin film 4 sharply declines from a portion that has come to contact with the pulp mold 10 during the process of shaping. This sharp decline in the temperature at the portion of the resin film 4 contacted with the pulp mold 10 causes a large gap in the temperature of the resin film 4 between the portion contacted with the pulp mold 10 and the portion not contacted with the pulp mold 10. This gap in the temperature could lead to rupture of the resin film 4 in the course of the shaping, which is not an appropriate molten state for bonding. Thus, there is a possibility that the resin film 4 could not be shaped and bonded in a stable manner.

The present invention has been made in view of the above circumstances and has a purpose of providing a thermoforming device that achieves improvement in manufacturing efficiency and achieves stable bonding of a resin film to a fiber molding.

Means of Solving the Problems

To solve the above problem, a thermoforming device according to one aspect of the present invention has the following configuration.

A thermoforming device comprises a radiation heater and a base provided to oppose the radiation heater with a resin film interposed therebetween, the thermoforming device being configured to perform: heating of radiationally heating the resin film to a predetermined temperature by the radiation heater; and bonding the resin film which has been radiationally heated to a fiber molding placed on the base, wherein the thermoforming device is provided with a depressurizing member to evacuate a space between the fiber molding and the resin film to bring the resin film into close contact with the fiber molding in the bonding, and the radiation heater is changeable in its distance to the resin film between a first heating position of radiationally heating the resin film in the heating and a second heating position of radiationally heating the resin film in the bonding.

The above-mentioned thermoforming device is, preferably, the distance of the radiation heater to the resin film is closer at the second heating position than at the first heating position.

The above-mentioned thermoforming device is, preferably, provided with a control program to perform: the heating by controlling output of the radiation heater at a heating temperature necessary for the resin film to reach the predetermined temperature within a predetermined time and by positioning the radiation heater (6) at the first heating position; and the bonding by evacuating by use of the depressurizing member and moving the radiation heater to the second heating position with maintaining the heating temperature.

According to the above-mentioned thermoforming device, the radiation heater is changeable in its distance relative to the resin film between the first heating position of radiationally heating the resin film in the process of the heating to heat the resin film to the predetermined temperature for molding and the second heating position of radiationally heating the resin film in the process of the boding to bond the resin film to the fiber molding. Accordingly, the second heating position is closer in its distance from the radiation heater to the resin film than the first heating position, so that an amount of heat to be given to the resin film by the radiation heater can be increased when the resin film is to be bonded to the fiber molding.

Increase in the amount of heat to be given to the resin film by the radiation heater in bonding the resin film to the fiber molding can achieve reduction in a time required for radiationally heating the resin film, which has been cooled due to contact with the fiber molding, to the temperature high enough for molding again as compared with a conventional art. Thereby, the manufacturing efficiency can be improved.

Further, increase in the amount of heat to be given to the resin film by the radiation heater in bonding the resin film to the fiber molding can achieve restraint of temperature fall of the resin film which is caused by the contact of the resin film with the fiber molding. Thus, it is possible to lessen the temperature gap of the resin film in a portion contacted with the fiber molding and a portion not contacted with the fiber molding. Accordingly, bonding of the resin film to the fiber molding can be stably performed.

Further, in the above-mentioned thermoforming device, preferably, the distance of the radiation heater to the resin film is more distant at the second heating position than at the first heating position.

When the resin film is radiationally heated by the radiation heater in the process of the bonding, there is a possibility that the fiber molding could be excessively heated depending on its material, which could possibly result in obstructing stable shaping and bonding of the resin film and could cause occurrence of smoke or fire. According to the above-mentioned thermoforming device, the second heating position is set such that the distance between the radiation heater and the resin film is more distant than the first heating position, so that it is possible to reduce the amount of heat to be given to the fiber molding by the radiation heater in the process of the bonding. Therefore, the fiber molding can be prevented from excessive heating.

Effects of the Invention

According to the thermoforming device of the present invention, the manufacturing efficiency can be improved and bonding of the resin film to the fiber molding can be stably performed.

BRIEF DESCRIPTION OF THE DRAWINGS

Figure 5:
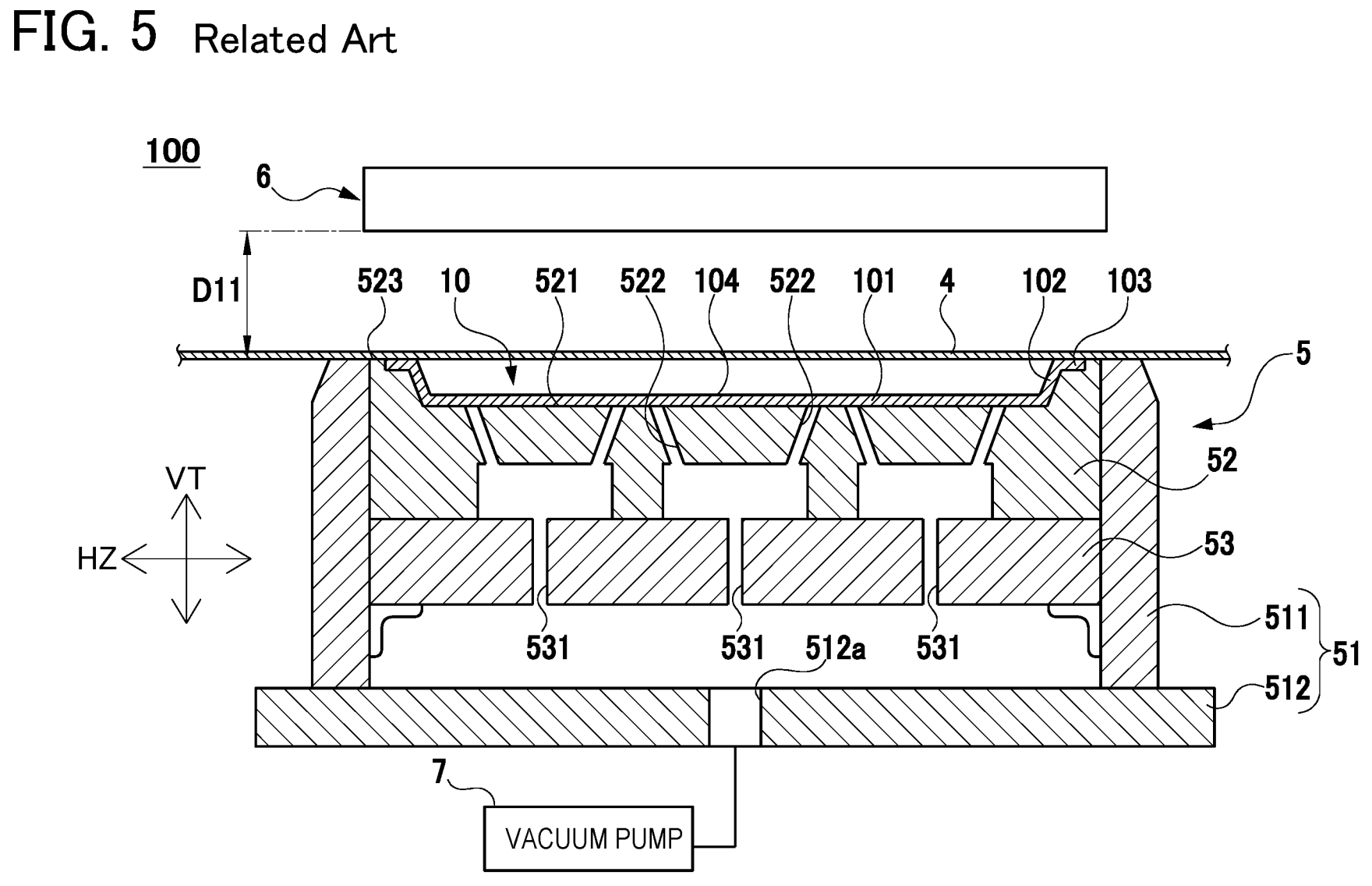

FIG. 5 is a schematic view showing a configuration of a thermoforming device according to a prior art.

MODE FOR CARRYING OUT THE INVENTION

First Embodiment

Figure 1:
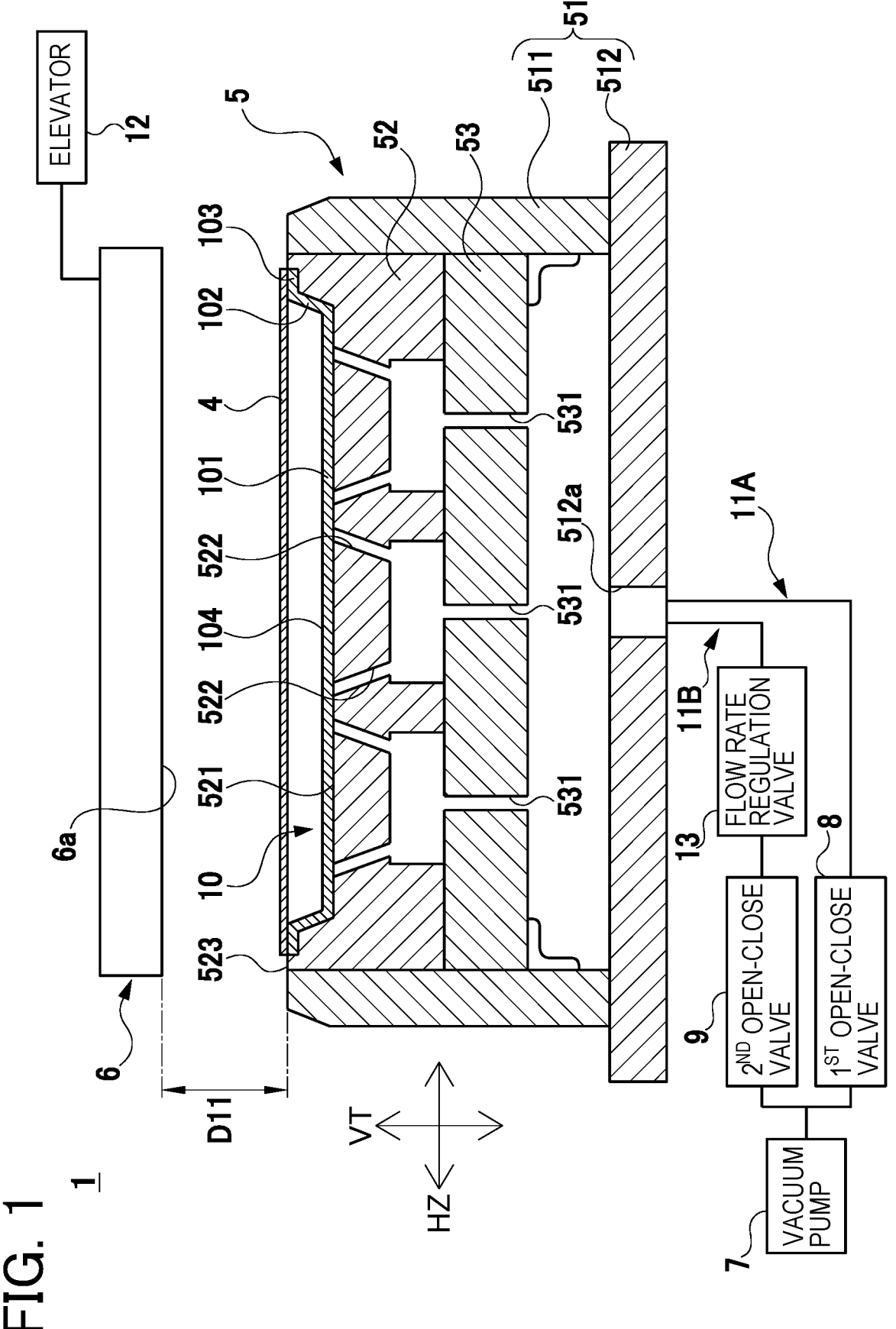
FIG. 1 is a schematic view showing a configuration of a thermoforming device according to the present embodiment in a state in which the thermoforming device is under a heating process.
Figure 2:
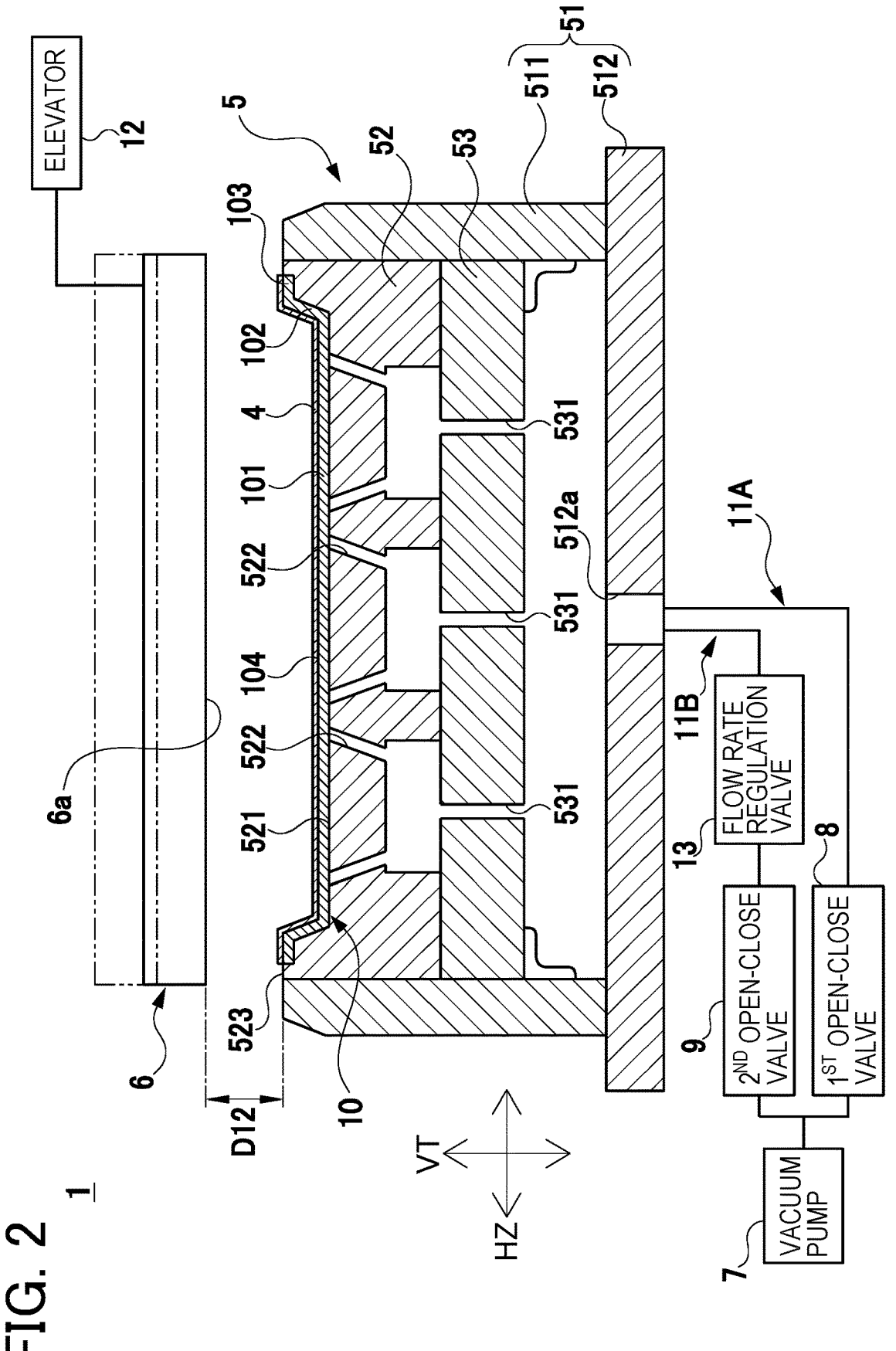
FIG. 2 is a schematic view showing a state in which the thermoforming device according to the present embodiment is under a bonding process.
Figure 3:
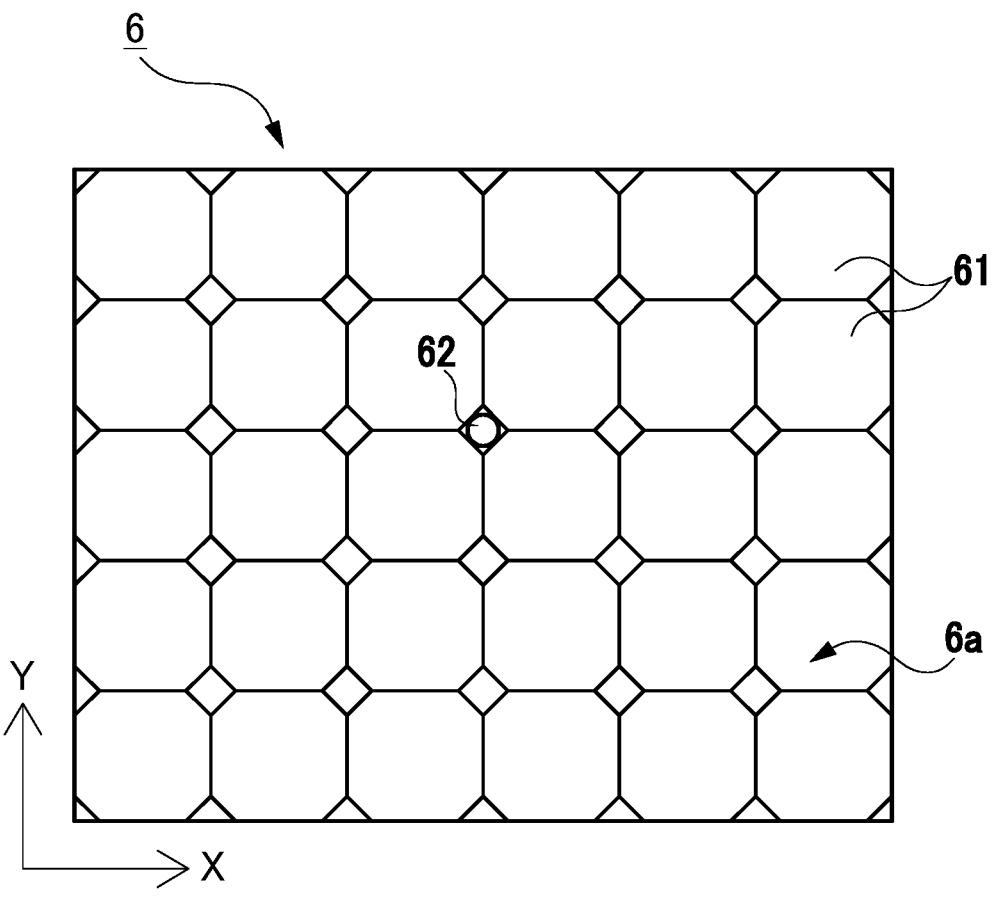
FIG. 3 is a plan view of a radiation heater when seen from a side of a heat radiation portion.

A thermoforming device according to a first embodiment of the present invention is explained with reference to the accompanying drawings. FIG. 1 shows a configuration of a thermoforming device 1 according to the present embodiment and also shows a state in which the thermoforming device 1 is under a heating process. FIG. 2 shows the thermoforming device 1 according to the present embodiment under a bonding process. FIG. 3 is a plan view of a radiation heater 6 when seen from a side of a heat radiation portion 6a.

<Configuration of Thermoforming Device>

The thermoforming device 1 according to the first embodiment is, as shown in FIG. 1, a device provided with a lower die 5 and the radiation heater 6 for radiationally heating a resin film 4 to a predetermined temperature for molding and bonding the resin film 4, which has been radiationally heated and softened, to a pulp mold 10 (one example of a fiber molding) placed on the lower die 5. Herein, a step of radiationally heating the resin film 4 to the predetermined temperature for molding by the radiation heater 6 is defined as the heating process, and a step of bonding the resin film 4 that has been radiationally heated and softened to the pulp mold 10 placed on the lower die 5 is defined as a bonding process.

The pulp mold 10 is, for example, a packaging container for food products, which is made of pulp wood as raw material and shaped to have a thickness of about 0.5 to 3 mm. A shape of the pulp mold 10 is not specifically limited, but for example, the product has a bottom portion 101 of an oval shape in planar view (a state seen from an upper side in FIG. 1), a peripheral wall portion 102 standing from a periphery of the bottom portion 101, and a flange portion 103 outwardly extending from an upper end of the peripheral wall portion 102 to an outside of the pulp mold 10. Further, an inner face 104 of the pulp mold 10 on a side of the radiation heater 6 (an upper side in FIG. 1) is a surface to be contacted with the food products which are to be filled in the pulp mold 10. As the pulp material, wood pulp (which is limited to virgin material) and non-wood pulp (which is limited to virgin material) using materials such as reed, sugar cane, bamboo are used. However, in a case the pulp mold 10 is not aimed for food products, wood pulp and non-wood pulp of recycled materials and waste paper pulp utilizing waste paper such as newspapers, magazines, and corrugated cardboard other than the above materials may be used as the pulp material. The pulp mold 10 is a fiber assembly utilizing the above-mentioned pulp materials, and thus the pulp mold 10 has breathability and allows the air to pass through an upper face side and a lower face side in FIG. 1 before bonding with the resin film 4.

The resin film 4 is a thermal plastic film made of polypropylene (PP) as a material. Herein, the material is not limited to the polypropylene (PP) and may be any other material as long as the material meets the criteria in view of food sanitation (for example, the criteria established pursuant to the Food Sanitation Act in Japan). For example, olefinic resin such as polyethylene (PE), polyester resin such as polyethylene terephthalate (PET), and ethylene vinylacetate copolymer, and others may be adopted.

A face of the resin film 4 opposing the pulp mold 10 is a bonding face which is to be bonded to the inner face 104 of the pulp mold 10. The bonding face is provided with a bonding layer (not shown) for improving the bonding performance with the pulp mold 10. This bonding layer is provided by application of thermal bonding resin such as a heat seal material or by extrusion coating of the thermal bonding resin.

A thickness of the resin film 4 is preferably less than 100 μm for the purpose of saving the manufacturing cost, and in the present embodiment, for example, a resin film with a thickness of 80 μm is used. In the figures, the thickness of the resin film 4 seems to be about as half as a thickness of the pulp mold 10, but the figures are only drawn in view of easy visibility, and thus the actual thickness is different from the one in the figures. Further, a melting point of the resin film 4 is not specifically limited, but one example is 167° C., and the resin film 4 is heated in the heating process to a predetermined moldable temperature. This moldable temperature is, for example, 160° C. (a temperature C21 (see FIG. 4 (d)) in the present embodiment.

Further, the resin film 4 has been cut in advance along an outer shape of the pulp mold 10 in planar view (a view seen from an upper side in FIG. 1) before the resin film 4 is shaped by the thermoforming device 1. Specifically, as shown in FIG. 1, the resin film 4 is partly bonded only to a flange portion 103 of the pulp mold 10 and cut in advance along an outer circumference of the flange portion 103. Herein, bonding only to the flange portion 103 and cutting of the resin film 4 may be performed by another device other than the thermoforming device 1 as a prior process. Alternatively, the thermoforming device 1 may be provided with a cutting device such as a Thomson blade so that the resin film 4 is bonded only to the flange portion 103 and cut along the outer circumference of the flange portion 103 by the subject cutting device.

The resin film 4 as configured above is heated to about 160° C. by the radiation heater 6 in the thermoforming device 1, and thereafter, as shown in FIG. 2, the resin film 4 is shaped along the inner face 104 of the pulp mold 10 and bonded to the inner face 104. The pulp mold 10 is bonded with the resin film 4, so that the pulp mold 10 obtains water resistance, oil resistance, and thermal resistance.

The lower die 5 is provided with a frame 51, a pedestal 53, and a base 52. The frame 51 is formed of components made of metal such as stainless steel, and includes a cradle 512 and a peripheral wall 511 provided to stand from the cradle 512. The cradle 512 is formed with a vent 512a penetrating through the cradle 512 in the vertical direction VT, and this vent 512a is connected with a vacuum pump 7 (one example of a depressurizing member). The vacuum pump 7 can perform vacuum suction inside the frame 51 through the vent 512a.

The pedestal 53 is fixed above the cradle 512 and surrounded by the peripheral wall 511 to mount the base 52 thereon. The pedestal 53 includes a plurality of communication paths 531 penetrating through the pedestal 53 in the vertical direction VT. An end face of the pedestal 53 on an upper side in the vertical direction VT is mounted with the base 52 surrounded by the peripheral wall 511 to set the pulp mold 10 thereon.

The base 52 is hollowed out to form a setting face 521 conforming to a shape of the pulp mold 10 on an end face of the base 52 on a side of the radiation heater 6 (on the upper side in the vertical direction VT). The base 52 is further provided with a plurality of vacuum vent holes 522 opening on the setting face 521. When the frame 51 is evacuated by the vacuum pump 7, the setting face 521 side is evacuated thorough the communication paths 531 and the vacuum vent holes 522. The pulp mold 10 is breathable, and thus even when the pulp mold 10 is set on the setting face 521, pressurizing and vacuum suction of the setting face 521 side are not obstructed. Accordingly, vacuum suction of the setting face 521 side in a state shown in FIG. 1 can achieve vacuum suction of a space between the pulp mold 10 and the resin film 4. As a result of this, the resin film 4 can be closely bonded to the inner face 104 of the pulp mold 10 with no space.

To the vent 512a of the lower die 5, the vacuum pump 7 is connected by a first pipe 11A and a second pipe 11B which are arranged in parallel.

A first open-close valve 8 is provided on the first pipe 11A. The first pipe 11A is open by opening the first open-close valve 8, and the vacuum pump 7 is allowed to perform vacuum suction through the first pipe 11A. On the other hand, the first pipe 11A is shut off by closing the first open-close valve 8.

On the second pipe 11B, a second open-close valve 9 and a flow rate regulation valve 13 are provided in this order from a side of the vacuum pump 7. The second pipe 11B is open by opening the second open-close valve 9, and the vacuum pump 7 is allowed to perform vacuum suction through the second pipe 11B. On the other hand, the second pipe 11B is shut off by closing the second open-close valve 9. Further, the flow rate regulation valve 13 is adjustable in its valve open degree, and by adjusting the valve open degree, the exhaust rate for vacuum suction can be regulated through the second pipe 11B.

The vacuum pump 7 is continuously operated during operation of the thermoforming device 1. When the first open-close valve 8 is open and the second open-close valve 9 is closed, vacuum suction can be performed through the first pipe 11A at the maximum exhaust rate S11 (see FIG. 4 (b)) corresponding to the performance of the vacuum pump 7. On the other hand, when the first open-close valve 8 is closed and the second open-close valve 9 is open, vacuum suction can be performed through the second pipe 11B at the exhaust rate (for example, a predetermined exhaust rate S12 explained later (see FIG. 4 (b)) corresponding to a valve open degree of the flow rate regulation valve 13.

The radiation heater 6 is placed to oppose the lower die 5 with the resin film 4 interposed therebetween. The radiation heater 6 includes a heat radiation portion 6a on its end face on a side of the lower die 5, and this heat radiation portion 6a is formed of a plurality of heater elements 61 as shown in FIG. 3. Specifically, in the radiation heater 6, the six heater elements 61 (each of which is of an octagonal shape in planar view) are arranged adjacently in a row in an X-direction and the five rows are arranged adjacently in a Y-direction. The radiation heater 6 thus includes the thirty heater elements 61 in total. These thirty heater elements 61 configure the heat radiation portion 6a. Herein, the X-direction in FIG. 3 is a direction parallel to a horizontal direction HZ in FIG. 1 and FIG. 2. Further, the number of the heater elements 61 is not limited to the above number that is merely one example.

Figure 4:
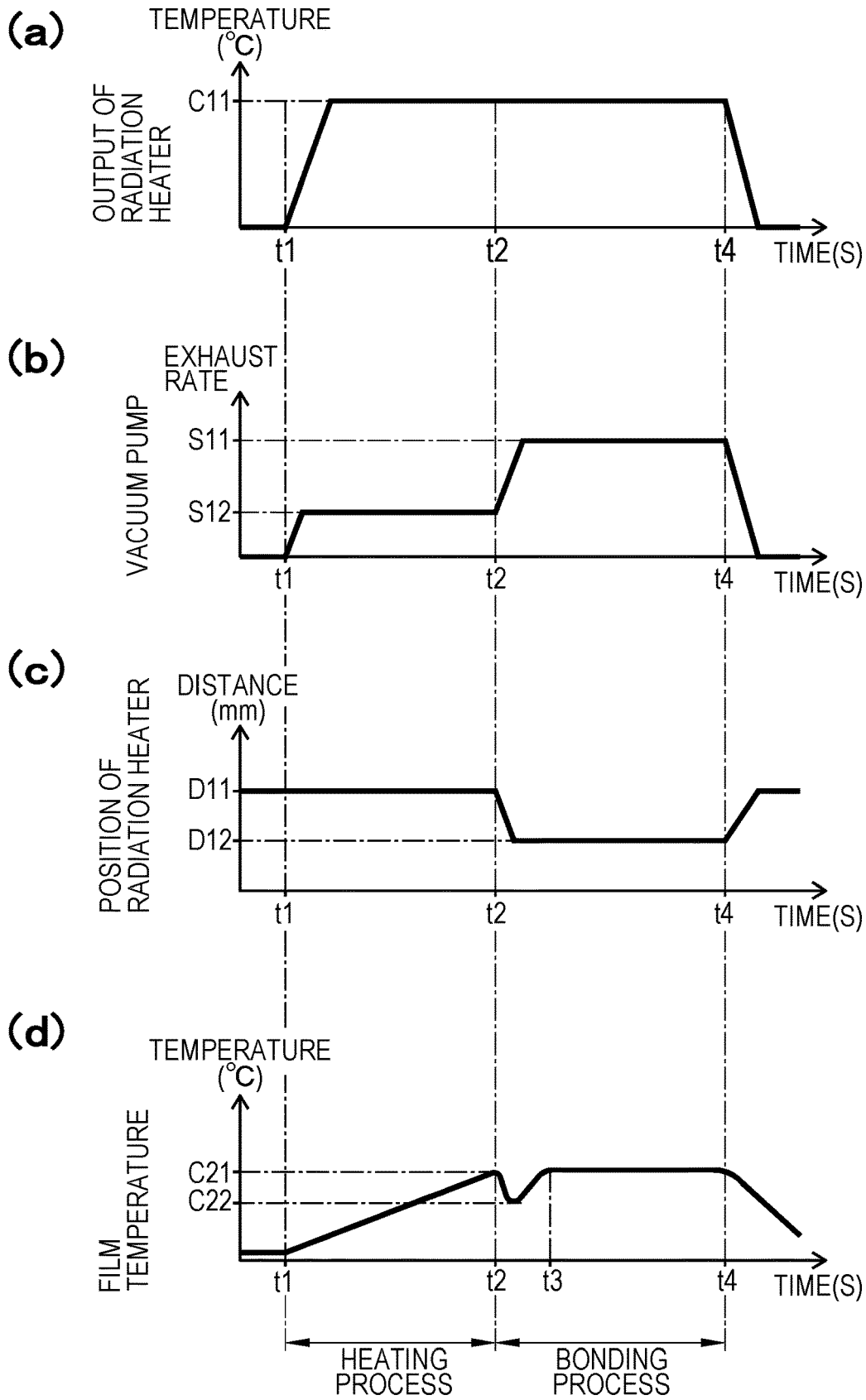
FIG. 4 is a graph in which (a) is a time chart of output of the radiation heater in the bonding process and the heating process, (b) is a time chart of an exhaust rate of a vacuum pump in the bonding process and the heating process, (c) is a time chart of a position of the radiation heater in the bonding process and the heating process, and (d) is a time chart of changes in a temperature of a resin film in the bonding process and the heating process.

Further, the radiation heater 6 is provided with a temperature sensor 62 which is surrounded by the four heater elements 61 in a central region of the radiation heater 6 as shown in FIG. 4. The temperature sensor 62 is a radiation thermometer, for example. This temperature sensor 62 is configured to measure a temperature of one face of the resin film 4 opposing the radiation heater 6. Thus, the thermoforming device 1 can detect the temperature of the resin film 4 in the heating process and the bonding process.

The radiation heater 6 is allowed to move upward and downward along the vertical direction VT by an elevator 12 (for example, an air cylinder or the like) and allowed to move between the first heating position and the second heating position. A position of the radiation heater 6 shown in FIG. 1 is the first heating position for performing radiation heating of the resin film 4 in the heating process. A position of the radiation heater 6 shown in FIG. 2 is the second heating position for performing radiation heating of the resin film 4 in the bonding process. A distance D12 of the radiation heater 6 at the second heating position to the base 52 is made to be shorter than a distance D11 of the radiation heater 6 at the first heating position to the base 52. The radiation heater 6 is thus movable between the first heating position and the second heating position, so that the distance of the radiation heater 6 to the resin film 4 is changeable. Herein, the distance D11 of the radiation heater 6 at the first heating position to the base 52 and the distance D12 of the radiation heater 6 at the second heating position to the base 52 are determined based on output of the radiation heater 6, material of the resin film 4, target time taken for the heating process and the bonding process, and others.

<Heating Process and Bonding Process>

The heating process and the bonding process performed by use of the above configured thermoforming device 1 are explained with reference to FIG. 4. FIG. 4 (*a*) is a time chart indicating the output of the radiation heater 6 in the bonding process and the heating process. FIG. 4 (*b*) is a time chart indicating the exhaust rate of the vacuum pump 7 in the boding process and the heating process. FIG. 4 (*c*) is a time chart of the position of the radiation heater 6 (that is, the distance of the radiation heater 6 to the base 52) in the bonding process and the heating process. FIG. 4 (*d*) is a graph indicating changes in the temperature of the resin film 4 in the bonding process and the heating process.

Before performing the heating process and the bonding process, the resin film 4 has been bonded only at the flange portion 103 of the pulp mold 10, and then the resin film 4 has been cut along an outer shape of the pulp mold 10 in planar view. Then, as shown in FIG. 1, the pulp mold 10 is set on the setting face 521 of the base 52. Herein, operation of setting the pulp mold 10 on the setting face 521 may be performed by an operator's hand or by an automatic conveyer and others.

Further, before performing the heating process and the bonding process, the vacuum pump 7 has been operated in a state in which the first open-close valve 8 and the second open-close valve 9 are closed to shut off the first pipe 11A and the second pipe 11B. Furthermore, the valve open degree of the flow rate regulation valve 13 has been adjusted so that a predetermined exhaust rate S12 (see FIG. 4 (*b*)) is obtained when the second open-close valve 9 is to be opened. Detail about the predetermined exhaust rate S12 will be explained later.

Firstly, the heating process is explained. As shown in FIG. 4 (*a*), the output of the radiation heater 6 is initiated at a time t1 to start the heating process. The output of the radiation heater 6 is constant at a temperature C11 through the heating process and the bonding process. A value of the temperature C11 is determined appropriately by the performance of the radiation heater 6, the material of the resin film 4 as an object to be heated, and others. The temperature value is not especially limited, but in the present embodiment, the value is determined as 600° C. which is the maximum output of the radiation heater 6. Further, the distance of the radiation heater 6 to the base 52 is set as the distance D11 as shown in FIG. 4 (*c*). This means that the radiation heater 6 is positioned at the first heating portion.

Vacuum suction by the vacuum pump 7 starts at the time t1 as indicated in FIG. 4 (*b*) at the predetermined exhaust rate S12. This vacuum suction is performed by opening the second open-close valve 9 to open the second pipe 11B while the first open-close valve 8 is kept closed.

The resin film 4 is kept bonded to the flange portion 103 of the pulp mold 10, and thus air is trapped or contained in a space between the pulp mold 10 and the resin film 4. Accordingly, when the radiation heater 6 performs heating in this state, the air contained between the pulp mold 10 and the resin film 4 becomes expanded and thereby the resin film 4 gets bloated to the side of the radiation heater 6 (the upper side in FIG. 1). This bloating makes the distance between the radiation heater 6 and the resin film 4 closer to excessively heat the resin film 4, which could cause failure such as getting a hole in the film. To address this problem, vacuum suction is performed at the predetermined exhaust rate S12 as mentioned above to prevent bloating of the resin film 4 to the radiation heater 6 side, and thereby the resin film 4 is prevented from excessive heating.

The predetermined exhaust rate S12 is determined depending on the output of the radiation heater 6, a volume of the pulp mold 10, and others. The predetermined rate at which the resin film 4 is prevented from bloating to the radiation heater 6 side has been obtained in advance by experiments. Thus, the valve open degree of the flow rate regulation valve 13 is adjusted corresponding to the predetermined exhaust rate S12 that has been obtained by the experiments. Herein, it is preferable that the resin film 4 is maintained horizontally as much as possible by vacuum suction at the predetermined exhaust rate S12. This is aimed for evenly heating the entire resin film 4. The resin film 4 is however not necessarily kept horizontal, and the resin film 4 only needs to be prevented from bloating to the radiation heater 6 side. Specifically, by performing vacuum suction at the predetermined exhaust rate S12, for example, the resin film 4 may be concavely deformed to the side of the pulp mold 10 to an extent that shaping of the film does not occur. Further, vacuum suction at the predetermined exhaust rate S12 is to be carried out at the time t1 concurrently with start of the heating process, but vacuum suction may not be started concurrently. For example, experiments may be carried out in advance to confirm the timing of start of expansion of the air contained between the pulp mold 10 and the resin film 4 since start of heating, and vacuum suction at the predetermined exhaust rate S12 may be performed at that timing.

To return to the explanation of FIG. 4, the temperature of the resin film 4 increases in proportion to the lapse of time from the time t1 when the radiation heater 6 starts heating as shown in FIG. 4 (*d*). When the temperature of the resin film 4 reaches the temperature C21 (160° C.) at which the film 4 can be molded at the time t2, the heating process is completed. The time required for the heating process (a period of time from the time t1 to the time t2) is determined depending on the output of the radiation heater 6, the distance of the radiation heater 6 to the base 52, the material of the resin film 4, and others, and the time in the present embodiment is determined as about 8 seconds.

Next, the bonding process is explained. After completion of the heating process, vacuum suction by the vacuum pump 7 is performed at the maximum exhaust rate S11 as shown in FIG. 4 (b). This vacuum suction is performed by closing the second open-close valve 9 to shut off the second pipe 11B and opening the first open-close valve 8 to open the first pipe 11A at the same time. By performing vacuum suction at the maximum exhaust rate S11, the resin film 4 is shaped along the shape of the pulp mold 10 as shown in FIG. 2.

Further, at the time t2, a distance of the radiation heater 6 to the base 52 is changed to the distance D12 as shown in FIG. 4 (c). This means that the radiation heater 6 is at the second heating position. At this time, the output of the radiation heater 6 is in a constant state as shown in FIG. 4 (a).

The resin film 4 has been shaped to be brought into contact with the pulp mold 10, so that the resin film 4 is cooled by the pulp mold 10, which causes fall in the temperature of the resin film 4 to the temperature C22 as shown in FIG. 4 (d). However, the radiation heater 6 at the second heating position keeps heating the resin film 4, and thus the temperature of the resin film 4 recovers to the temperature C21 at the time t3.

The distance of the radiation heater 6 at the second heating position is closer to the resin film 4 than at the first heating position, and thus the amount of heat to be given to the resin film 4 by the radiation heater 6 can be increased. Therefore, the time (a period of time from the time t2 to the time t3) required for radiationally heating the resin film 4, which has been cooled by the contact with the pulp mold 10, to reach the temperature C21 again is shorter than the time (a period of time from the time t2 to the time t5 in FIG. 6 (d)) required conventionally. Specifically, the required time has been reduced by 20 to 60% compared with the time required conventionally.

Further, when the resin film 4 is to be bonded to the pulp mold 10, the amount of heat to be given to the resin film 4 by the radiation heater 6 can be increased. Accordingly, a decrease amount of the temperature of the resin film 4 due to the contact with the pulp mold 10 (a decrease amount from the temperature C21 to the temperature C22) can be restrained. To be more specific, as compared with the conventional decrease amount of the temperature (a decrease amount from the temperature C21 to the temperature C22 in FIG. 6 (d)), the decrease amount is reduced by 20 to 60%. This results in relaxation in the temperature gap generated between a portion of the resin film 4 contacted with the pulp mold 10 and another portion not contacted with a fiber molding. Accordingly, bonding of the resin film 4 to the pulp mold 10 can be stably performed.

To return to the explanation of FIG. 4, heating by the radiation heater 6 and vacuum suction by the vacuum pump 7 are continued since start of the bonding process to the time t4. This continuation is aimed for tight contact and bonding of the resin film 4 to the pulp mold 10 in a further assured manner.

The radiation heater 6 terminates its output at the time t4 as shown in FIG. 4 (a). Concurrently, the radiation heater 6 returns to the first heating position as shown in FIG. 4 (c). Herein, the radiation heater 6 does not necessarily need to return to the first heating position and may be moved to a position further away from the base 52 than the first heating position. Further, the first open-close valve 8 is closed to shut off the first pipe 11A at the time t4, and thus vacuum suction is halted as shown in FIG. 4 (b). The bonding process is thus completed. The time required for the boding process (a period of time from the time t2 to the time t4) is determined depending on the output of the radiation heater 6, the distance of the radiation heater 6 to the base 52, a thickness and the material of the resin film 4, a density (an air permeability) of the pulp mold 10, and others, and the time in the present embodiment is set to about 6 to 10 seconds.

Figure 6:
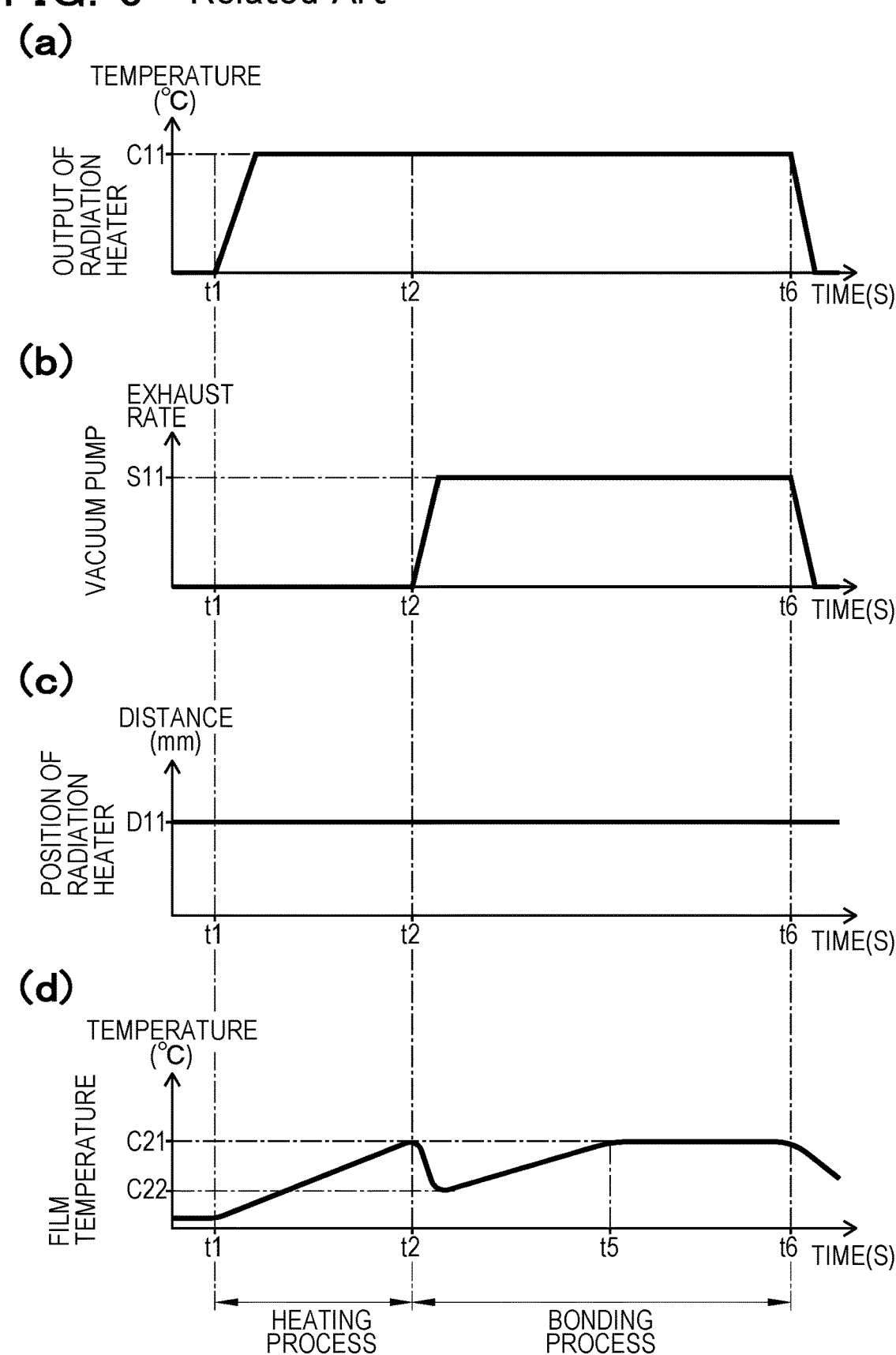
FIG. 6 is a graph in which (a) is a time chart of output of the radiation heater in the bonding process and the heating process in the prior art, (b) is a time chart of an exhaust rate of a vacuum pump in the bonding process and the heating process in the prior art, (c) is a time chart of a position of the radiation heater in the bonding process and the heating process in the prior art, and (d) is a time chart of changes in a temperature of a resin film in the bonding process and the heating process in the prior art.

As mentioned above, the time (a period of time from the time t2 to the time t3) required for radiationally heating the resin film 4, which has been cooled due to the contact with the pulp mold 10, until the temperature reaches the temperature C21 again is shorter than the time conventionally required (a period of time from the time t2 to the time t5 in FIG. 6 (d)). Accordingly, the time (from the time t2 to the time t4) required for the bonding process is shorter by 20 to 60% than the time (from the time t2 to the time t6 in FIG. 6) required for the conventional bonding process, thereby improving the manufacturing efficiency.

After completion of the boding process, the pulp mold 10 bonded with the resin film 4 is removed from the base 52. This operation of removing the pulp mold 10 bonded with the resin film 4 may be performed by an operator's hand or an automatic conveyer or the like.

The heating process and the bonding process explained above are automatically performed by a control program which is stored in a control device (not shown) connected to the thermoforming device 1.

Second Embodiment

A thermoforming device according to a second embodiment is explained only with different points from the thermoforming device 1 of the first embodiment.

The thermoforming device according to the second embodiment has the similar configuration with the thermoforming device 1 of the first embodiment shown in FIG. 1, but the second heating position of the radiation heater 6 is different from the second heating position of the thermoforming device 1 of the first embodiment in FIG. 1. The second heating position in the thermoforming device according to the second embodiment is set such that the distance of the radiation heater 6 to the base 52 is further distant than the first heating position. Namely, the radiation heater 6 goes far away from the resin film 4 while the process transfers from the heating process to the bonding process.

When the radiation heater 6 is to radiationally heat the resin film 4 in the bonding process, there is a possibility that the pulp mold 10 could be excessively heated to get burnt depending on its material. To address this, the radiation heater 6 is brought away from the resin film 4 in the boding process so that the amount of heat to be given to the pulp mold 10 by the radiation heater 6 is reduced. Thus, excessive heating of the pulp mold 10 can be prevented.

As explained above, the thermoforming device 1 according to the embodiments is provided with the radiation heater 6 and the base 52 opposing the radiation heater 6 with the resin film 4 interposed therebetween, and the thermoforming device 1 is to perform the heating process of radiationally heating the resin film 4 to the predetermined temperature C21 by the radiation heater 6 and the bonding process of bonding the radiationally heated resin film 4 to the fiber molding (the pulp mold 10) set on the base 52. The thermoforming device 1 includes a depressurizing member (the vacuum pump 7) to perform vacuum suction between the fiber molding (the pulp mold 10) and the resin film 4 to bring the resin film 4 into close contact with the fiber molding (the pulp mold 10) in the boding process. The thermoforming device 1 is further configured such that the radiation heater 6 is changeable in its distance from the resin film 4 between the first heating position to perform radiation heating of the resin film 4 in the heating process and the second heating position to perform radiation heating of the resin film 4 in the bonding process.

In the above-mentioned thermoforming device 1, preferably, the radiation heater 6 is closer in its distance to the resin film 4 at the second heating position than at the first heating position.

The above-mentioned thermoforming device 1 preferably includes a control program carrying out control of the output of the radiation heater 6 to be at the heating temperature (the temperature C11) required for the resin film 4 to reach the predetermined temperature C21 within a predetermined time (from the time t1 to the time t2) and positioning the radiation heater 6 at the first heating position for performing the heating process. The control program further carries out vacuum suction by the depressurizing member (the vacuum pump 7) and moving the radiation heater 6 to the second heating position with keeping the heating temperature (the temperature C11) to carry out the bonding process after completion of the heating process.

According to the above-mentioned thermoforming device 1, the radiation heater 6 is changeable in its distance to the resin film 4 between the first heating position of radiationally heating the resin film 4 in the heating process of heating the resin film 4 to the predetermined temperature C21 for molding and the second heating position of radiationally heating the resin film 4 in the bonding process of bonding the resin film 4 to the fiber molding (the pulp mold 10). The second heating position is arranged closer in the distance between the radiation heater 6 and the resin film 4 than the first heating position, and thus the amount of heat to be given to the resin film 4 by the radiation heater 6 can be increased when the resin film 4 is to be bonded to the fiber molding (the pulp mold 10).

When the resin film 4 is to be bonded to the fiber molding (the pulp mold 10), increase in the amount of heat to be given to the resin film 4 by the radiation heater 6 can reduce the time (from the time t2 to the time t3) required for radiationally heating the resin film 4, which has got cooled due to the contact with the fiber molding (the pulp mold 10), to reach the temperature C21 for molding again as compared with the conventional one. Accordingly, the manufacturing efficiency can be improved.

Further, when the resin film 4 is to be bonded to the fiber molding (the pulp mold 10), increase in the amount of heat to be given to the resin film 4 by the radiation heater 6 can achieve restraint of fall in the temperature (decline from the temperature C21 to the temperature C22) which could be caused by the contact of the resin film 4 to the fiber molding (the pulp mold 10). Thus, it is possible to lessen the gap in the temperature of the resin film 4 between the portion contacted with the fiber molding (the pulp mold 10) and the portion not contacted with the fiber molding (the pulp mold 10), and accordingly, bonding of the resin film 4 to the fiber molding (the pulp mold 10) can be performed in a stable manner.

Further, in the above-mentioned thermoforming device 1, preferably, the radiation heater 6 is more distant from the resin film 4 at the second heating position than at the first heating position.

When the resin film 4 is to be radiationally heated by the radiation heater 6 in the bonding process, there is a possibility that the fiber molding (the pulp mold 10) could be excessively heated depending on the material, which could interfere stable shaping and bonding of the resin film 4 and further cause occurrence of smoke or fire. According to the above-mentioned thermoforming device 1, the second heating position is set more distant as for the distance between the radiation heater 6 and the resin film 4 than the first heating position, so that the amount of heat to be given to the fiber molding (the pulp mold 10) by the radiation heater 6 in the bonding process can be reduced. As a result of this, it is possible to prevent the fiber molding (the pulp mold 10) from being excessively heated.

The present embodiments are only illustration and give no any limitation to the present invention. Accordingly, the present invention can naturally be made with various improvements and modifications without departing from the subject matter. For example, the thermoforming device 1 is configured such that the one pulp mold 10 is set on the base 52 to perform bonding of the resin film 4, but alternatively, a plurality of the pulp molds may be performed with bonding of the resin film 4 at the same time. Further, the thermoforming device 1 is configured such that the radiation heater 6 is positioned above the lower die 5, but alternatively, the both may be positioned upside down.

REFERENCE SIGNS LIST

1 Thermoforming device
4 Resin film
6 Radiation heater
7 Vacuum pump (one example of a depressurizing member)
10 Pulp mold (one example of a fiber molding)
52 Base

The invention claimed is:

1. A thermoforming device comprising:
a controller;
a vacuum pump;
a valve;
a radiation heater; and
a base configured to oppose the radiation heater with a resin film interposed therebetween, wherein
the controller is configured to control heating of the resin film to a predetermined temperature with the radiation heater, and bonding of the resin film, which has been heated by the radiation heater, to a fiber molding placed on the base,
the controller is configured to control the vacuum pump and the valve to
evacuate a space between the fiber molding and the resin film to bring the resin film into close contact with the fiber molding in the bonding,
evacuate the space at a first exhaust rate during the heating of the resin film with the radiation heater to prevent air enclosed between the fiber molding and the resin film from expanding and thereby prevent the resin film from expanding, and
evacuate the space at a second exhaust rate during the bonding of the resin film, and
the radiation heater is changeable in distance to the resin film between a first heating position for radiationally heating the resin film in the heating and a second heating position for radiationally heating the resin film in the bonding.

2. The thermoforming device according to claim 1, wherein the distance of the radiation heater to the resin film is closer at the second heating position than at the first heating position.

3. The thermoforming device according to claim 1 wherein the controller is configured to:

control the heating by controlling output of the radiation heater at a heating temperature necessary for the resin film to reach the predetermined temperature within a predetermined time and by positioning the radiation heater at the first heating position; and control the bonding by evacuating using the depressurizing member and moving the radiation heater to the second heating position with maintaining the heating temperature.

4. The thermoforming device according to claim 1, wherein the distance of the radiation heater to the resin film is more distant at the second heating position than at the first heating position.

5. The thermoforming device according to claim 2 wherein the controller configured to:

control the heating by controlling output of the radiation heater at a heating temperature necessary for the resin film to reach the predetermined temperature within a predetermined time and by positioning the radiation heater at the first heating position; and control the bonding by evacuating using the depressurizing member and moving the radiation heater to the second heating position with maintaining the heating temperature.

\* \* \* \* \*